United States Patent

Abbott et al.

[11] Patent Number: 5,999,634
[45] Date of Patent: Dec. 7, 1999

[54] DEVICE AND METHOD FOR ANALYZING AN ELECTRONIC IMAGE SIGNAL

[75] Inventors: James P. Abbott, Camberley; Christopher Robert Gent, Crowthorne; William G. Thomas, Camberley; Gerald Sermon, Hook; Brian D. Stubbington, Farnborough, all of United Kingdom

[73] Assignee: Electronic Data Systems Corporation, Plano, Tex.

[21] Appl. No.: 08/862,521

[22] Filed: May 23, 1997

Related U.S. Application Data

[62] Continuation of application No. 08/541,347, Oct. 10, 1995, abandoned, which is a continuation of application No. 08/204,400, filed as application No. PCT/GB92/01669, Sep. 11, 1992, abandoned.

[30] Foreign Application Priority Data

Sep. 12, 1991 [GB] United Kingdom .................... 9119588

[51] Int. Cl.$^6$ ...................................................... G06K 9/00
[52] U.S. Cl. ............................ 382/103; 382/236; 348/140
[58] Field of Search ..................................... 382/100, 103, 382/107, 133, 236, 155, 156, 159, 218; 348/77, 135, 140, 143–161, 169–172

[56] References Cited

U.S. PATENT DOCUMENTS

| | | | |
|---|---|---|---|
| 4,249,207 | 2/1981 | Harman et al. ........................ | 358/108 |
| 4,931,868 | 6/1990 | Kadar ...................................... | 348/155 |
| 5,091,780 | 2/1992 | Pomerleau .............................. | 382/155 |
| 5,151,945 | 9/1992 | Lee et al. ................................ | 348/155 |
| 5,177,794 | 1/1993 | Abe et al. ............................... | 348/155 |
| 5,243,418 | 9/1993 | Kuno et al. .............................. | 35/108 |
| 5,293,456 | 3/1994 | Guez et al. ............................. | 382/159 |
| 5,467,402 | 11/1995 | Okuyama et al. ..................... | 382/104 |

OTHER PUBLICATIONS

Aleksander et al., Wisard — a radical step forward in image recognition, Jul. 1984, Sensor Review pp. 120–124.

*Primary Examiner*—Christopher S. Kelley
*Attorney, Agent, or Firm*—L. Joy Griebenow; Baker & Botts L.L.P.

[57] ABSTRACT

A number of systems and methods for analyzing electronic image signals are provided which include processing the image signal as one or more cells, each comprising a plurality of pixels. For consecutive frames of the monitored image, a set of pointers are generated, each containing a value related to the detail contents of the image. The pointers are used to address a memory array, each pointer corresponding to a row in the memory array and the content of each pointer pointing to a memory element in the corresponding row. For successive frames, the value of each memory element addressed by a pointer is updated.

39 Claims, 3 Drawing Sheets

DEVICE AND METHOD FOR ANALYZING AN ELECTRONIC IMAGE SIGNAL

This application is a continuation of application Ser. No. 08/541,347, filed Oct. 10, 1995, now abandoned, which is a continuation of Ser. No. 08/204,400 Mar. 14, 1994 filed as PCT/GB92/01669, Sep. 11, 1992 also abandoned.

BACKGROUND OF THE INVENTION

1. Field of the Invention

The present invention relates to a method of image analysis and an apparatus for carrying out the method. The invention is particularly, although not exclusively, suited to surveillance applications.

2. Description of the Related Art

U.S. Pat. 4,249,207, issued to Computing Devices Company of Ottawa, Canada, relates to a surveillance system in which an image received by a television camera is divided electronically into an array of cells or 'tiles'. The tiles are dimensioned to allow for perspective, so that they each cover substantially the same area regardless of the particular part of the image to which they respectively correspond. This is illustrated in FIG. 1 of the accompanying drawings. The system monitors each cell to determine whether a potentially significant event is occurring in each cell. If such an event is detected in one cell, neighbouring cells are checked and if an event is occurring in, say two, of these, it is taken as indicative of a track of a moving person or object of interest.

Occurrence of a potentially significant event in a cell is determined according to changes in the average light intensity received from that cell. Each cell consists of an array of pixels. These are analysed line by line and the integrated incident light intensity for that cell is computed. Over time, a weighted comparison is continuously made between the average present intensity and the average intensity in a previous frame. If the result of this comparison exceeds a predetermined threshold, then that is taken as a potentially significant event occurring in that cell.

The aforementioned U.S. patent states that this system provides good discrimination against false events such as moving cloud shadows. However, that system is best suited to generally empty scenes such as the area between two perimeter fences sited in an open landscape. It is much less able to discriminate against false events in a busy scene, such as may occur in an urban environment.

Specific disadvantages of this known system are:

a. It is overly sensitive to certain small variations in the image e.g. due to weather changes, clouds, tree movement, etc. This leads to a large number of false alarms resulting from normal changes in a scene;

b. it has low sensitivity to certain large variations in the image, e.g., a small light change spread across a tile has the same effect as a large light change in part of a tile. This can cause some events of interest to be missed; and c. large changes in the image desensitise the system for a while. As a result, a return to a normal scene will cause an activity alarm, and this reduces the ability to track movement and identify the shape of objects, since tiles vacated by a slow object have the same activity as a tile being entered by the object.

The above problems explain why this existing system is only effective in scenes with very little variation in light levels. In fact it is only effective for monitoring indoor scenes or outdoor scenes where there is no expectation of movement, e.g., dead zones between fences surrounding a prison.

The present invention in its various aspects has a significant advantage over that described in the aforementioned U.S. patent in that it provides the ability to 'learn' the nature of a complex backround. This enables it to discriminate better for genuine events of interest in an otherwise crowded or busy scene.

Another previously known system called 'WISARD' is described by I. Aleksander et al in Sensor Review, July 1984, pp 120–124. Pixels within a cell are interrogated pseudo-randomly. In the latter disclosure it is stated that the intensity of light incident on a pixel can be converted to a Grey-scale signal or alternatively, binary signal.

In the latter case, the detected light level is compared with a threshold and a 1 or 0 is set according to whether the intensity is below the threshold or not. These binary signals are then combined into groups, which form pointers into an array stored in a random access memory (RAM). Each time an array element is addressed by a pointer, its value is set to "on" otherwise it is left unchanged. This process is carried out over a number of "frames".

Thus, with WISARD, over successive frames, values in certain elements of the array become set. This is in effect a 'training period'. After sufficient frames have elapsed, the array is considered suitably primed and the system is put into run mode and pointers are generated in the same way. Then, if a pointer addresses an element which is set, this indicates that the intensities in pixels forming the pointer are similar to values which occurred in the training set. Pointers which address elements which are not set indicate that the situation is different from the training period. In this way WISARD detects when the scene changes.

It will be apparent that WISARD can only compare the present situation with what happened during its finite 'training' period and has no memory for events before or since. Also, transient events in the training period have as much effect as common events. As a result, WISARD cannot continuously improve its record of background, and so is limited in its ability to discriminate between significant events and the backround.

The present invention is capable of continuously improving its record of the background and so can provide better discrimination than WISARD.

A first aspect of the present invention provides a method of analysing an electronic image signal, the method comprising:

(a) processing the image signal to regard it as representing one or more cells each comprising a plurality of pixels;

(b) for consecutive frames of the monitored image, generating characteristic values according to the detailed content of the image; and (c) for consecutive image frames, accumulating the characteristic values so that in a single operational mode, both a time history of the image, stored in a memory, is updated and an indication is produced indicative of the occurence or non-occurence of an event not associated with image background.

The first aspect of the invention also includes a device for analysing an electronic image signal, the device comprising electronic means for effecting steps (a)–(c) in the aforementioned method.

The present invention in general, mitigates the problems of the prior art referred to above and can extend the possibilities for scene monitoring to a wider variety of scenes. In particular, the invention is suited to monitoring scenes with a large amount of normal activity, for example to monitor busy street scenes to identify specific events. Examples of such events are:

arrival of an obstruction on a railway line, arrival or departure of a vehicle through a gate, arrival or departure of a person through a door, occurence of congestion on a railway platform.

Although in its widest definition, the first aspect of the invention requires only one cell, it is preferred that the image is represented as a plurality of cells, most preferably adjusted for perspective as hereinbefore described.

A preferred method of generating the characteristic values is to randomly or pseudo-randomly select pairs of pixels and for each pair, generate a (preferably binary) signal in dependence upon whether or not the intensity of light incident on a predetermined one of the pair of pixels is greater than the intensity of light incident on the other.

Thus, a second aspect of the present invention provides a method of analysing an electronic image signal, the method comprising:

(a) processing the image signal to regard it as representing one or more cells each comprising a plurality of pixels; and (b) for consecutive frames of the monitored image, randomly or pseudo-randomly selecting pairs of pixels in the cell or cells, as appropriate, and for each pair, generating a binary signal in dependence upon whether or not the intensity of light incident on a predetermined one of the pair of pixels is greater than the intensity of light incident on the other.

The second aspect of the invention also includes a device for analysing an image signal, the device comprising electronic means for effecting steps (a) and (b) of the method according to the second aspect of the invention.

Preferably at least one pair of pixels is so selected for each of a plurality of cells. It is also much preferred to select in the same way, a plurality of pixels for each cell of the image field.

Once one or more pairs of pixels are selected in a given cell, the same pixels can then be used in subsequent frames until the end of the operating session. -In a subsequent session, the same pairs could be used again or different pairs selected for the remainder of that session.

When a plurality of pixel pairs are used in a given cell, it is possible for the same pixel to be used in more than one pair, although this is not absolutely necessary. It is also possible, although not mandatory, for one or some of the pixels not to be used in any pair.

For different cells, the pair or pairs of pixels could be chosen at the same relative positions in each although again, this is not necessary.

We also prefer utilising the characteristic values to generate pointers for addressing the memory containing the time history of the image. A particularly advantageous means of doing this is to generate a set of pointers $a_1 \ldots, a_m$, each of n binary bits and sequentially setting these bits according to the respective binary values of the signals resulting from the comparisons of the pixel pairs. In other words, pairs $1, \ldots, n$ of the pixel pairs are used to set the values of a $[1, \ldots, n]$ then pairs $(n+1), \ldots, 2n$ are used to set $a_2 [1, \ldots, n]$ and so on.

Therefore, a third aspect of the present invention provides a method of analysing an electronic image signal, the method comprising:

(a) processing the image signal to regard it as representing one or more cells each comprising a plurality of pixels;

(b) for consecutive frames of the monitored image, generating characteristic values according to the detailed content of the image; and (c) generating a set of pointers $a_1, \ldots, a_m$, each of n binary bits and sequentially setting these bits according to the characteristic values.

The third aspect of the present invention also includes a device for analysing an image signal, the device comprising electronic means for effecting steps (a)–(c) of the method according to the third aspect of the invention.

The values of n and m may be any convenient and may be the same or different, but n×m will be equal to the number of characteristic values. Therefore, in the context of the second aspect of the invention, n×m will be equal to half the number of pixels selected in each cell.

In a preferred embodiment, these pointers are used to address a memory comprising an array of addresses comprising rows $1, \ldots, m$ and columns $1, \ldots, 2^n$. When the characteristic values have been used to set the values of the pointers, the latter address the memory as follows. Pointer $a_1$ addresses row 1. The pointer contains a binary number of value somewhere between 0 and $2^n$. The pointer points to the column in row 1 having a column number corresponding to the value in $a_1$. The value in that address is then incremented by 1 (at the outset, all addresses will be set to zero). This is done for all rows up to m. In the next frame, the whole process is repeated, updating the value by 1 in a particular address pointed to in each row.

Therefore, a fourth aspect of the present invention provides a method of analysing an electronic image signal, the method comprising:

(a) processing the image signal to regard it as representing one or more cells each comprising a plurality of pixels;

(b) for consecutive frames of the monitored image, generating a set of pointers each containing a value related to the detailed content of the image; and (c) using the pointers to address a memory array and for successive frames, updating the value of an address in each row of the array indicated by the pointer corresponding to that row.

The fourth aspect of the present invention also includes a device for analysing an image signal, the device comprising electronic means for effecting steps (a)–(c) of the method according to the fourth aspect of the invention.

In a preferred embodiment, the set of pointers comprises pointers $a_1, \ldots, a_m$, each of n binary bits and the memory array has m rows and $2^n$ columns.

It will be appreciated that in terms of a memory array, the terms 'rows' and 'columns' are purely arbitrary and therefore may be transposed.

A further advantageous feature of the invention is the way in which the values in the memory are used to discriminate between the background and unusual or unexpected occurences. In successive frames, for each row in the memory, the maximum value at any address in the row is determined, the value currently pointed at also being known. For all the rows, the ratio of the sum of values in currently pointed to addresses, divided by the sum of the maxima is calculated. This ratio is compared with a time weighted average for the same ratio from previous frames. If this ratio is less than a chosen proportion of the time weighted average then it is taken as indicative of an unusual or unexpected event occuring in the relevant cell.

Thus a fifth aspect of the present invention provides a method of analysing an electronic image signal, the method comprising:

(a) processing the image signal to regard it as representing one or more cells each comprising a plurality of pixels;

(b) for consecutive frames of the monitored image, updating one address in each row of a memory array in dependence on the detailed content of the image; and (c) over all the rows, summing the values in the addresses being updated and summing the maximum value in each row, subjecting the ratio of the two sums to a time weighted averaging with respect to the ratios obtained from previous frames, comparing the ratio with the time weighted average and using the result to determine the occurence or non-occurence of a significant event within the image.

The fifth aspect of the present invention also includes a device for analysing an image signal, the device comprising electronic means for effecting steps (a)–(c) of the method according to the fifth aspect of the invention.

When the present invention in any of its aspects is manifested as a device as opposed to a method, the device may be implemented as hardware/firmware arranged to operate under the control of appropriate software or it may be realised in terms only of hardware/firmware configured from logic gates, flip-flops etc, arranged to carry out the required functions.

BRIEF DESCRIPTION OF THE DRAWINGS

The invention will now be illustrated by way of the following description of a preferred embodiment and with reference to the accompanying drawings in which.

DESCRIPTION OF THE PREFERRED EMBODIMENTS

Figure 1:
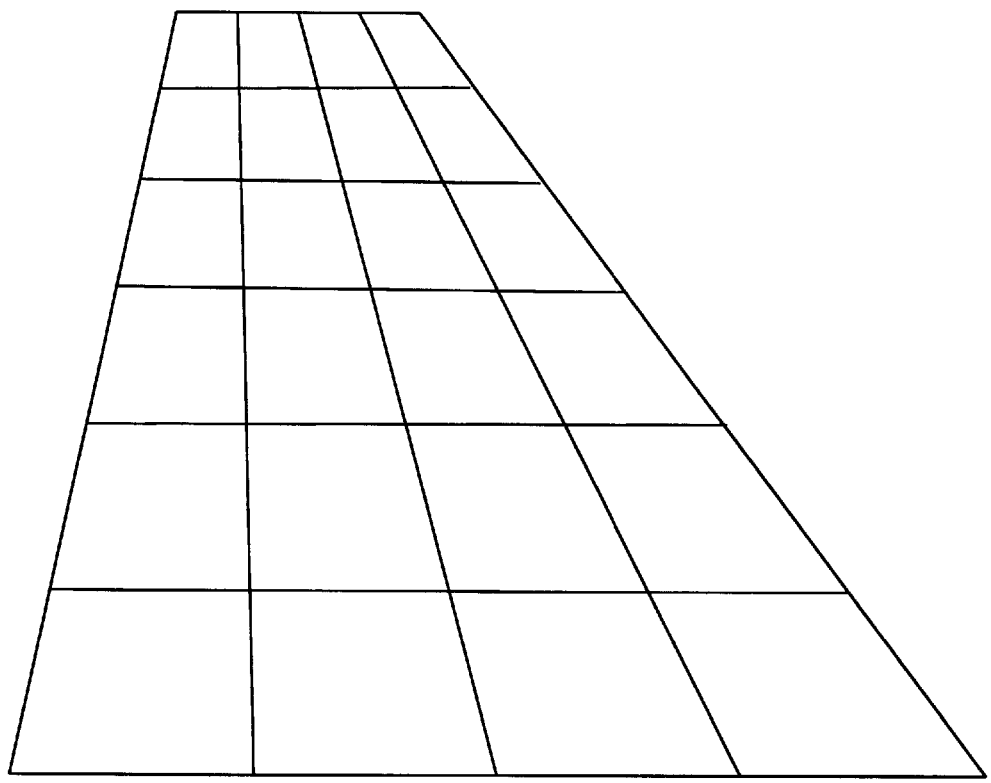
FIG. 1 shows the arrangement of cell boundaries to take account of perspective.

Before describing the preferred embodiment in detail it is convenient first to define the following terms, these definitions applying only to the described embodiment and not limiting the scope of the claimed invention:

Pixel A pixel (picture element) defines a grey level at a point in an image. Typically up to 256 grey levels are represented in 8-bits.

Image

An image is an array of pixels, typically 512×512.

Tile

A tile (cell) is a subset of an image made up of N pixels. N must be even. The pixels in a tile are denoted:

$P_1, P_3, \ldots, P_N$.

Let $M=N/2$.

Pixel Ordering

The pixels are randomly ordered and divided into two halves: P1 $P_1, P_2, \ldots, P_m, q_1, q_2, \ldots, q_M$.

Pointer Generation

Generate bits $b_1, b_2, b_3, \ldots, b_M$ as:

if $p_1 > q_1$ then $b_1 = 0$ else $b_1 = 1$, if $p_2 > q_2$ then $b_2 = 0$ else $b_2 = 1, \ldots$ if $p_M > q_M$ then $b_M = 0$ else $b_M = 1$.

Let $m = M/n$.

Generate m n-bit binary addresses:

$a_1 = [b_1 \, b_2 \, b_3 \ldots b_n]$, $a_2 = [b_{n+1} b_{n+2} \ldots b_{2n}], \ldots$ $a_m = [\ldots b_{M-1} b_M]$, The m addresses $a_1, a_2, \ldots, a_m$ characterise the instantaneous image in the tile and act as pointers into the memory array defined below.

Memory

Memory is an $m \times 2^n$ array of data values holding information about the past history of the scene. This array is continually updated as the process proceeds.

In addition, the maximum value in each row of Memory is maintained in an array max. The notation is that, for $j=1, \ldots, m$:

$\max_j =$ maximum of Memory[j,i], $i=1, \ldots, 2^n$.

Address $a_j$ points to a cell in the $j$th row of the memory. This cell is denoted:

Memory[j,$a_j$].

Frame Rate

Image frames are processed at a chosen rate, which will be application specific. The time at which the current frame is processed is denoted by t, and the time at which the previous frame was processed is denoted t-1.

Parameters

Parameters f, UpperLimit and k are selected to determine time constants over which a history is required.

Threshold is a parameter which determines the detection sensitivity of the technique.

The purpose of the mechanisms is to compute, for each tile, an activity level indicating if the image is in a normal state.

The mechanisms are implemented by the following means:

a. a TV camera which captures images and outputs these images in a standard format, b. an Image Frame Grabber which captures the images at the frame rate of the camera, digitises each frame and stores it in a digital frame buffer, c. a Computer Processor which performs Pointer Generation by
   accessing the Image Frame Buffer and
   computing pointers into a Memory array, d. a Digital store, the Memory array, to accumulate statistics about Images, e. a Computer Processor which uses the pointers to increment the Memory array (Memory Update), f. a Computer Processor which accesses the Memory array to compute measures of Activity in the Image.

The Computer Processors in c), e) and f) may be a single processor, or these activities may be distributed across several processors.

Running the process is preceded by defining tiles and pixel orders. The choice and size of tiles is application specific.

Figure 2:
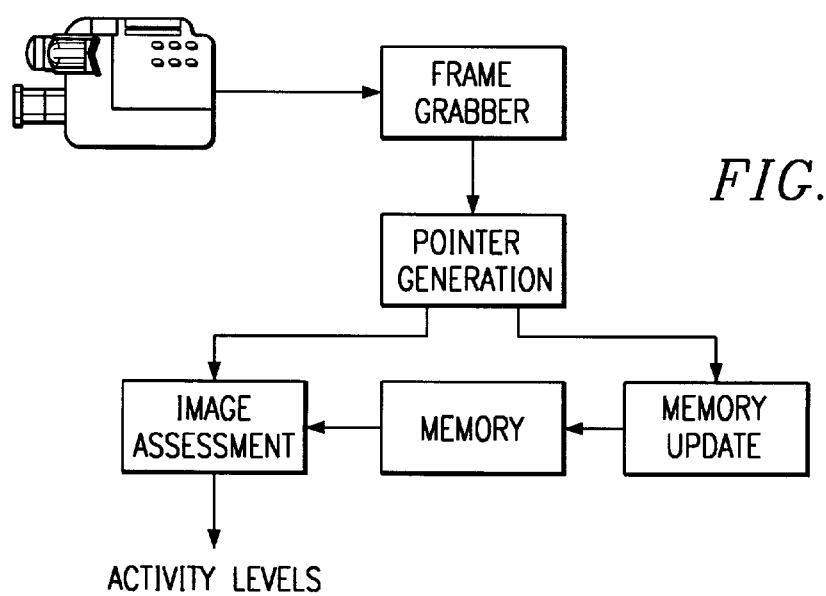
FIG. 2 is a diagramatic representation of a device according to the present invention, for computing activity levels.
Figure 3:
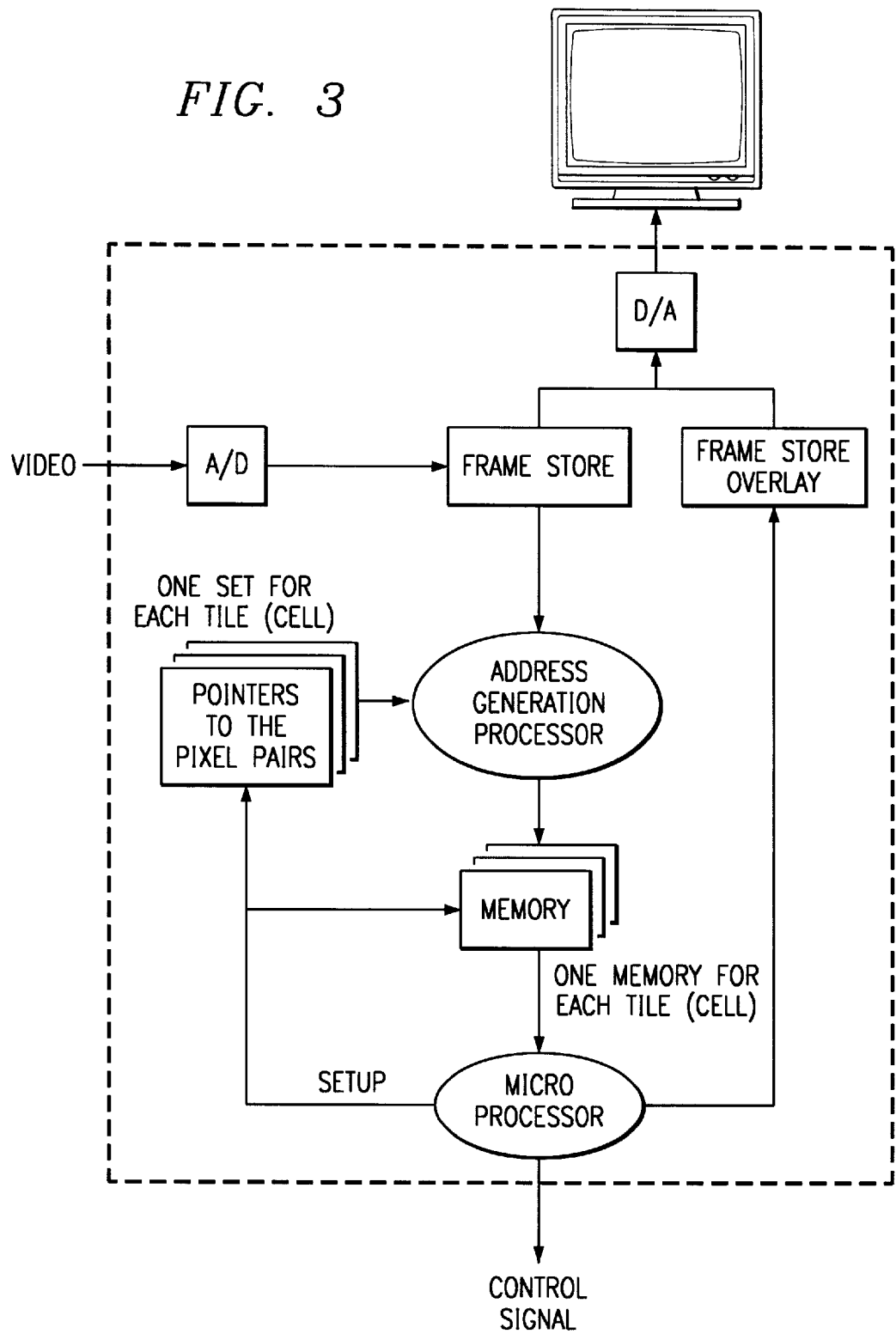
FIG. 3 is a block diagram of the hardware of the device shown in FIG. 2.

When running, images are captured in the Frame Buffer at the frame rate of the camera. The Computer Processors then carry out the following actions relating to each frame analysed. The Computation is described below and is carried out for each tile and the relationship between the separate processes is represented in FIG. 2 and the precise nature of the computer hardware is shown in FIG. 3.

Pointer Generation

Generate pointers into the Memory, as follows.

For each $j=1, \ldots, m$ generate address $a_j$, as described above.

Memory Update

Perform Memory Update to maintain a history of past images as follows:

For each j=1, . . . , m Increment Memory [j, $a_j$] by 1, and update $max_j$ to be the maximum element in the jth row of Memory.

If Memory [j, $a_j$]>UpperLimit then scale the jth row of Memory, ie:

Compute Memory [j, i])=f* Memory [j, i], i=1, . . . , $2^n$, and compute $max_j$=f* $max_j$.

Image Assessment

Perform Image Assessment to determine the current state of the image by computing a Score, to be compared against an Average Score.

Sum the values Memory [j, $a_j$], j=1, . . . , m, denoted Score. Sum the values maxi, 1, . . . , m, denoted maximum. Calculate a value $A_t$ defining the instantaneous Activity in the image at time t by computing: $A_t$=Score/Maximum, (Note: $A_t$ can take values between 0 and 1). Calculate the Average Activity in the image at time t by computing: $Average_t$=k* $Average_{t-1}$+(1-k)*$A_t$(Note: $Average_t$ can take values between 0 and 1). Calculate the measured $Activity_t$ at time t by: $Activity_t$=($Average_t$- $A_t$) (Note: $Activity_t$ can take values between -1 and 1). If $Activity_t$>Threshold then indicate that the Tile is Active.

The overall technique described above derives a single value ($Activity_t$) which indicates whether the current scene has changed from recent scenes. The time frame over which the change is being determined is specified by choice of the parameters f and k. For example; for a slowly varying background scene values of f and k close to 1 could be used. Smaller values would be necessary where the background scene changes rapidly.

Unlike other previously known schemes, the technique is sensitive to real changes to the scene and discriminates between these and typical acceptable changes to the scene. This is because the memory array remembers the characteristics of a normal scene.

The calculation of the pointers as described above is very sensitive to local changes in a tile, but is insensitive to global light changes in a tile. Each pointer causes a location in Memory to be incremented. Thus scenes which are common will cause certain Memory locations to be incremented frequently, whilst other locations will be incremented rarely.

Whilst a scene is in a common state (note that the light levels may be changing significantly and the content of the scene may be changing) then the pointers will be addressing Memory locations containing large values. Then the derived values of Activity will be small or negative.

However, when an unusual change occurs in the image, this will affect several pointers which will now address Memory locations containing low values. The resulting value of Activity will then be high (ie close to 1).

In this way, the technique immediately identifies changes in the image. A local change, caused for example by a person moving in the scene, may affect only a small number of pixels. Suppose, for example that ten pixels are affected, then because of the way the pointers are generated, this change will typically affect ten pointers. Thus a small local change will have a large affect on the Activity score.

Also, because of the way the Memory remembers past scenes, when the activity ends the computed Activity immediately reverts to a small value. In this way the presence or absence of an event in a tile can be monitored accurately.

The result of the computations is to derive, for each image processed, an attribute Active, which can take the value true or false, for each tile. These Active values can be input to a process which determines the nature of an event in the scene. Such a process can track events and compute shape and size attributes of objects in the scene. The reliability of the claimed procedure for identifying active tiles, as opposed to ambient light changes, makes it possible to perform Event Recognition successfully.

In general, the number of pixels in a tile is application specific. The size of a tile will depend upon the size of object to be identified in the scene. Also, because of perspective, the number of pixels in each tile will vary.

In the same way, the number of pixel pairs in a tile, M, is also application specific and tile specific. In general not all pixels in a tile need be considered and pixels can generally be undersampled. However, given the definition in the present preferred embodiment, M should be no smaller than 8.

In order to exploit the 8-bit memory addressing of modern computers, n is generally selected as 8. Also, elements of Memory are typically 8-bit locations, and so UpperLimit would normally be chosen as 255.

Each tile is processed separately, and generates m pointers into the Memory array. In practice, more sensitivity can be gained by repeating the pixel generation a number of times to define more pointers. Typically three re-orderings of pixels are used, generating 3m pointers which implies a Memory array of 3m×$2^n$ elements.

The rate at which images are processed is typically 25 frames per second. This could be less depending on the rate at which events occur in the scene. The mechanism incorporates flexibility so that the system can be implemented on a single computer or several computers depending on the frame rate required.

The processing mechanisms previously defined show how each tile is assessed to see if it is Active. The determination of events in the scene can then be carried out by consideration of how the Activity values vary temporally and spatially.

In contrast to other previously known schemes, the determination of events can be carried out successfully using simple logic based on Activity values. This is because the claimed mechanisms reduce the false alarm rate, i.e. the rate at which tiles are indicated as Active when they are not.

The active values can be used to Track objects passing through the scene. In this case a tile has the additional attribute Track, which can take the value true or false, to indicate if an object is currently passing through that tile.

Figure 4:
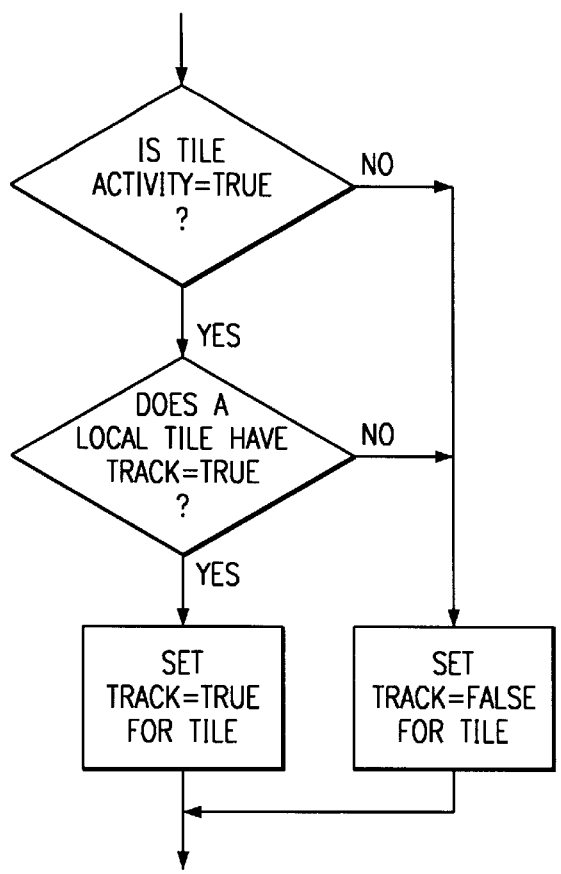
FIG. 4 is a flowchart showing the logic applied to each cell to determine the existence or absence of a track.

The logic applied to each tile is indicated in the Flowchart presented in FIG. 4. The tests are applied at time step t based on the Active value at time t and the Track values at time t-1.

Tracks in an arbitrary direction are determined by defining local tiles to be:

a. all tiles contiguous to the tile of interest, including, b. the tile itself.

Figure 5:
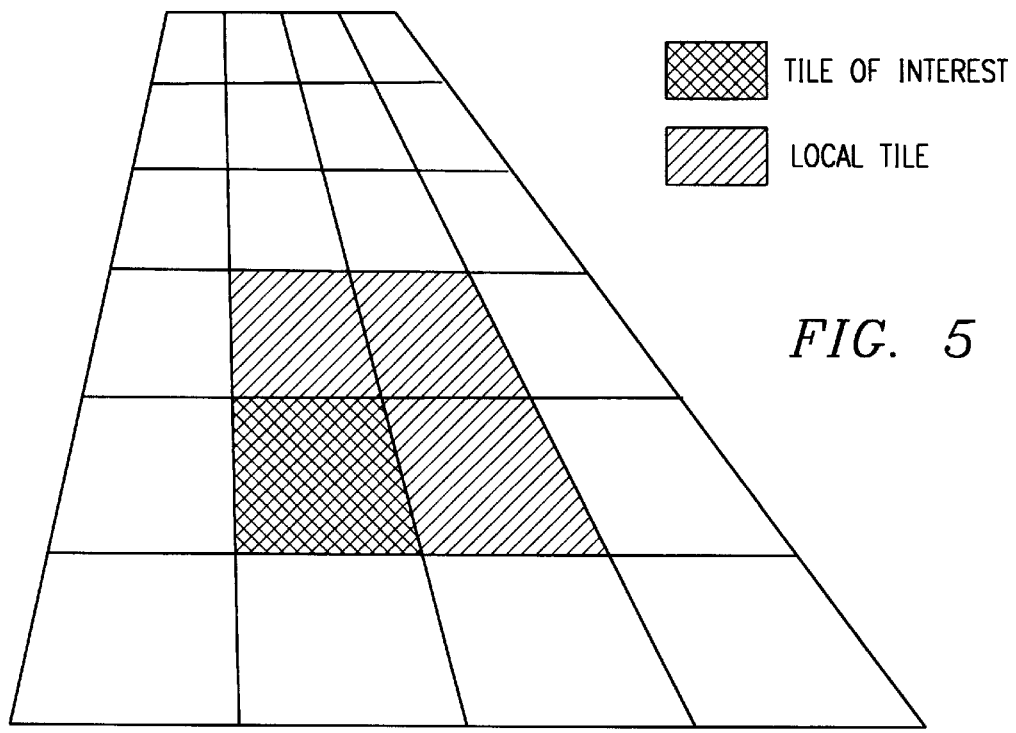
FIG. 5 shows the spatial relationship of local cells for movement from top right to bottom left.

To detect movement in a particular direction, "local tiles" is defined accordingly. For example as indicated in FIG. 5 to track movement from the top right to the bottom left of a scene, local tiles would be chosen to be:

a. contiguous tiles above and to the right of the tile of interest, and b. the tile itself.

Tiles which have a Track value of true can be indicated on an image to show moving objects. Also, a combination of track direction can be used to detect objects which exhibit specific behaviour, e.g:

a. movement down followed by across the image, b. an object moving in a specific direction and then pausing in the image (see below), c. an object moving through the scene and then passing through a door, or vice versa.

The Active and Track values can be used to detect objects which move into the scene and then stop. This is achieved by counting for each tile, the consecutive frames for which the tile has a Track value of true. The event is identified when this count passes a prescribed threshold.

This process can identify, for example, a vehicle parking in a busy street, or a person loitering in a busy walkway.

Various aspects of the present invention may also be embodied in the known WISARD system hereinbefore described. It will now be explained how WISARD can be so adapted.

The original WISARD system involves generation of pointers into a binary memory array for a fixed period, i.e., a fixed number of frames. The scheme is unsuccessful because:

a. it cannot adapt to changing scenes, and is therefore only applicable to fixed scenes, b. it is very sensitive to certain small light changes because of the way it replaces a grey scale image by a binary (black/white) image.

Suitably modified, a combination of the WISARD Pointer Generation together with the Memory Update and Image Assessment of the present invention can be more effective. The following description identifies these modifications in presenting a Pointer Generation scheme which can be very effective so long as the images processed have a large contrast (i.e. a wide range of light levels). The notation is essentially the same as used hereinbefore and has the same meanings.

Given a threshold $T_2$, bits $b_1, b_2 \ldots, b_N$ are generated as follows:

If $P_1 > T_2$ then $b_1 = 0$ else $b_1 = 1$, if $P_1 > T_2$ then $b_2 = 0$ else $b_2 = 1, \ldots$ if $P_N > T_2$ then $b_N = 0$ else $b_N = 1$.

Generate 1 n-bit binary addresses, where $1 = N/n$ $a_1 = [b_1 \, b_3 \, \ldots \, b_n]$, $a_2 = [b_{n+1} b_{n+2} \ldots b_{2n}], \ldots$ $a_1 = [\ldots b_{N-i} b_N]$, pointing to an $1 \times 2^n$ memory array.

This method of pointer generation is sensitive to choice of threshold $T_2$. In particular, an object which is a similar grey level to the background may have no effect on the pointers. This deficiency can be reduced by maintaining a second $1 \times 2^n$ memory array and deriving a second set of pointers as follows:

If $T_1 < P_1 < T_3$ then $b_1 = 0$ else $b_1 = 1$, if $T_1 < P_2 < T_3$ then $b_2 = 0$ $b_2 = 1, \ldots$ if $T_1 < P_N < T_3$ then $b_N = 0$ else $b_N = 1$.

In the same way as above, a second set of 1 n-bit addresses are generated from this second set of bits $b_1$, $b_2, \ldots, b_N$, which act as pointers into the second memory array. The Activity values derived from the two memory arrays are then averaged to give an accumulated Activity.

Then if the threshold $t_1$, $T_2$, $T_3$ are carefully chosen, a scheme based upon these pointers can also be successful. The threshold must be chosen to accommodate to variation in light level across the image. An effective way is to adjust them so that, across the whole image (i.e. across all the tiles):

25% of pixel values are less than $T_1$,

25% of pixel values lie between $t_1$ and $T_2$,

25% of pixel values lie between $T_2$ and $T_3$,

25% of pixel values are greater than $T_3$.

Then $T_1$, $T_2$ and $T_3$ must be adjusted for every image which is processed.

Clearly, this scheme could be extended to accommodate more light levels by introducing more thresholds. These Pointer Generation techniques are specific examples of a general process which generates bits $b_j$ (taking the values 0 or 1) as a function of pixel pairs and parameters. Thus the examples given take the form:

if $p > q$ then $b = 0$ else $b = 1$ if $p > T$ then $b = 0$ else $b = 1$

A further example is:

if $p > q + \text{epsilon}$ then $b = 0$ else $b = 1$, where epsilon is a fixed parameter value determined by the level of noise present in the image (due to camera and transmission effects).

We claim:

1. A method of analyzing an electronic image signal associated with an image that is being monitored, the method comprising:

(a) processing the image signal as one or more cells each comprising a plurality of pixels;

(b) for each consecutive frame of the monitored image, generating a set of pointers by randomly or pseudo-randomly selecting pairs of pixels within a frame and for each pair comparing a light intensity of one pixel against a light intensity of the other pixel, each pointer corresponding to a predefined subset of said plurality of pixels for a cell and each containing a value related to the detailed content of the portion of the frame of the monitored image corresponding to said predefined subset of said plurality of pixels;

(c) using the pointers to address a memory array, each pointer corresponding to a row of the memory array, and the content of each pointer pointing to a memory element in the corresponding row, each cell having its own memory array; and (d) for successive frames, updating the value of each memory element addressed by a pointer during monitoring of the image.

2. A method according to claim 1, wherein the set of pointers comprises pointers al. ...., am, each of n binary bits and the memory array has m rows and $_2$n columns.

3. A method according to claim 1, further comprising over all the rows, updating the value of memory pointed to by the content of each pointer, summing the updated values for each row, selecting the maximum memory value in each row, and summing the maximum memory value for all rows, subjecting the ratio of the two sums to a time weighted averaging with respect to the ratios obtained from previous frames, comparing the ratio with the time weighted average and using the result to determine the occurrence or non-occurrence of a significant event within the image.

4. A method according to claim 2, wherein the binary bits of the pointers are set in accordance with characteristic values generated for consecutive frames of the monitored image according to the detailed content of the image.

5. A method according to claim 4, wherein the characteristic values are accumulated for consecutive image frames so that in a single operational mode, a time history of the image, stored in a memory, is updated and an indication is produced indicative of the occurrence or non-occurrence of an event not associated with image background.

6. A device for analyzing an electronic image signal associated with an image that is being monitored, the device comprising electronic means for:

(a) processing the image signal as one or more cells each comprising a plurality of pixels;

(b) for each consecutive frame of the monitored image, generating a set of pointers by randomly or pseudo-randomly selecting pairs of pixels within a frame and for each pair comparing a light intensity of one pixel against a light intensity of the other pixel, each pointer corresponding to a predefined subset of said plurality of pixels for a cell and each containing a value related to the detailed content of the portion of the frame of the monitored image corresponding to said predefined subset of said plurality of pixels;

(c) using the pointers to address a memory array, each pointer corresponding to a row of the memory array, and the content of each pointer pointing to a memory element in the corresponding row, each cell having its own memory array; and (d) for successive frames, updating the value of each memory element addressed by a pointer during monitoring of the image.

7. A device according to claim 6, wherein said electronic means is adapted to generate said set of pointers as pointers a1, ... , am, each of n binary bits and the memory array has m rows and $_2$n columns.

8. A device according to claim 6, wherein said electronic means is adapted for, over all the rows, updating the value of memory pointed to by the content of each pointer, summing the updated values for each row, selecting the maximum memory value in each row, and summing the maximum memory value for all rows, subjecting the ratio of the two sums to a time weighted averaging with respect to the ratios obtained from previous frames, comparing the ratio with the time weighted average and using the result to determine the occurrence or non-occurrence of a significant event within the image.

9. A device according to claim 8, wherein said electronic means is adapted to set the binary bits of the pointers in accordance with characteristic values generated for consecutive frames of the monitored image according to the detailed content of the image.

10. A device according to claim 9, wherein said electronic means is adapted to accumulate the characteristic values so that in a single operation mode, a time history or the image, stored in a memory, is updated and an indication is produced indicative of the occurrence or non-occurrence of an event not associated with image background.

11. A device according to claim 7, wherein said electronic means comprises an image frame grabber, a memory and one or more computer processors.

12. A method of analyzing an electronic image signal associated with an image that is being monitored, the method comprising:

(a) processing the image signal as one or more cells each comprising a plurality of pixels;

(b) for each consecutive frame of the monitored image, generating characteristic values by randomly or pseudo-randomly selecting pairs of pixels within a frame and for each pair, generating a binary signal in dependence upon whether or not the intensity of light incident on one predetermined pixel of the pair of pixels is greater than the intensity of light incident on the other; and (c) for consecutive image frames, accumulating the characteristic values so that in a single operational mode, a time history of the image, stored in a memory, each cell having its own memory array is updated during monitoring of the image and an indication is produced indicative of the occurrence or nonoccurrence of an event not associated with image background.

13. A method according to claim 12, wherein the image is represented as a plurality of cells.

14. A method according to claim 13, wherein said plurality of cells is adjusted for perspective.

15. A device for analyzing an electronic image signal associated with an image that is being monitored, the device comprising electronic means for:

(a) processing the image signal as one or more cells each comprising a plurality of pixels;

(b) for each consecutive frame of the monitored image, generating characteristic values by randomly or pseudo-randomly selecting pairs of pixels within a frame and for each pair, generating a binary signal in dependence upon whether or not the intensity of light incident on one predetermined pixel of the pair of pixels is greater than the intensity of light incident on the other; and (c) for consecutive image frames, accumulating the characteristic values so that in a single operational mode, a time history of the image, stored in a memory, each cell having its own memory array is updated during monitoring of the image and an indication is produced indicative of the occurrence or nonoccurrence of an event not associated with image background.

16. A device according to claim 15, wherein the image is represented as a plurality of cells.

17. A device according to claim 16, wherein said electronic means is adapted to adjust said plurality of cells for perspective.

18. A device according to claim 15, wherein said electronic means comprises an image frame grabber, a memory and one or more computer processors.

19. A method of analyzing an electronic image signal associated with an image that is being monitored, the method comprising:

(a) processing the image signal as one or more cells each comprising a plurality of pixels; and (b) for each consecutive frame of the monitored image, randomly or pseudo-randomly selecting pairs of pixels in the cell or cells within a frame, and for each pair, generating a binary signal in dependence upon whether or not the intensity of light incident on one predetermined pixel of the pair of pixels is greater than the intensity of light incident on the other.

20. A method according to claim 19, wherein in step (b), at least one pair of pixels is selected for each of a plurality of cells.

21. A method according to claim 20, wherein in step (b), a plurality of pixels is selected for each cell of the image field.

22. A method according to claim 19, wherein the same pixels are used in each frame until the end of a subsequent operating session.

23. A method according to claim 19, wherein the binary signals are used to generate pointer for addressing the memory containing the time history of the image.

24. A method according to claim 23, wherein a set of pointers $a_1, \ldots, _m$ is generated, each of n binary bits and said bits are sequentially set according to the respective binary values of the signals resulting from comparisons of the pixel pairs.

25. A device for analyzing an electronic image signal associated with an image that is being monitored, the device comprising electronic means for:

(a) processing the image signal as one or more cells each comprising a plurality of pixels; and (b) for each consecutive frame of the monitored image, randomly or pseudo-randomly selecting pairs of pixels in the cell or cells within a frame, and for each pair, generating a binary signal in dependence upon whether or not the intensity of light incident on one predetermined pixel of the pair of pixels is greater than the intensity of light incident on the other.

26. A device according to claim 25, wherein said electronic means is adapted to select at least one pair of pixels for each of a plurality of cells.

27. A device according to claim 25, wherein said electronic means is adapted to select a plurality of pixels for each cell of the image field.

28. A device according to claim 25, wherein said electronic means is adapted to use the same pixels in each frame until the end of a subsequent operating session.

29. A device according to claim 25, wherein said electronic means is adapted to use the binary signals to generate pointers for addressing the memory containing the time history of the image.

30. A device according to claim 29, wherein said electronic means is adapted to generate a set of pointers $a_1, \ldots, a_m$, each of n binary bits and sequentially to set these bits according to the respective binary values of the signals resulting from comparisons of the pixel pairs.

31. A device according to claim 29, wherein said electronic means comprises an image frame grabber, a memory and one or more computer processors.

32. A method of analyzing an electronic image signal associated with an image that is being monitored, the method comprising:

(a) processing the image signal as one or more cells each comprising a plurality of pixels;

(b) for each consecutive frame of the monitored image, generating characteristic values according to the detailed content of the image; and (c) generating a set of pointers $a_1, \ldots a_m$ by randomly or pseudo-randomly selecting pairs of pixels within a cell and for each pair comparing a light intensity of one pixel against a light intensity of the other pixel, each pointer of n bits and sequentially setting these bits according to the characteristic values during monitoring of the image.

33. A method according to claim 32, wherein the pointers are used to address a memory array having m rows and $2^n$ columns, each pointer corresponding to a row of the memory array and the content of each pointer pointing to a memory element in the corresponding row, and the value of each memory addressed by a pointer is updated.

34. A device for analyzing an electronic image signal associated with an image that is being monitored, the device comprising electronic means for:

(a) processing the image signal as one or more cells each comprising a plurality of pixels;

(b) for each consecutive frame of the monitored image, generating characteristic values according to the detailed content of the image; and (c) generating a set of pointers $a_1, \ldots a_m$ by randomly or pseudo-randomly selecting pairs of pixels within a cell and for each pair comparing a light intensity of one pixel against a light intensity of the other pixel, each pointer of n bits and sequentially setting these bits according to the characteristic values during monitoring of the image.

35. A device according to claim 34, wherein the electronic means is adapted to use the pointers to address a memory array having m rows and $2^n$ columns, each pointer corresponding to a row of the memory array and the content of each pointer pointing to a memory element in the corresponding row, and to update the value of each memory addressed by a pointer.

36. A device according to claim 34, wherein said electronic means comprises an image frame grabber, a memory and one or more computer processors.

37. A method of analyzing an electronic image signal, the method comprising:

(a) processing the image signal as one or more cells each comprising a plurality of pixels;

(b) for each consecutive frame of the monitored image, updating a predetermined address in each row of a memory array in dependence on the detailed content of the image; and (c) over all the rows, updating the value of memory pointed to by the content of each pointer, summing the updated values for each row, selecting the maximum memory value in each row, and summing the maximum memory value for all rows, subjecting the ratio of the two sums to a time weighted averaging with respect to the ratios obtained from previous frames, comparing the ratio with the time weighted average and using the result to determine the occurrence or non-occurrence of a significant event within the image.

38. A device for analyzing an electronic image signal, the device comprising electronic means for:

(a) processing the image signal as one or more cells each comprising a plurality of pixels;

(b) for each consecutive frame of the monitored image, updating one address in each row of a memory array in dependence on the detailed content of the image; and (c) over all the rows, updating the value of memory pointed to by the content of each pointer, summing the updated values for each row, selecting the maximum memory value in each row, and summing the maximum memory value for all rows, subjecting the ratio of the two sums to a time weighted averaging with respect to the ratios obtained from previous frames, comparing the ratio with the time weighted average and using the result to determine the occurrence or non-occurrence of a significant event within the image.

39. A device according to claim 38, wherein said electronic means comprises an image frame grabber, a memory and one or more computer processors.

* * * * *